June 14, 1960 E. BONAMI 2,940,117
POULTRY STUFFING DEVICE
Original Filed Nov. 27, 1956 4 Sheets-Sheet 1

INVENTOR.
ERNEST BONAMI
BY R. G. Story
ATTORNEY

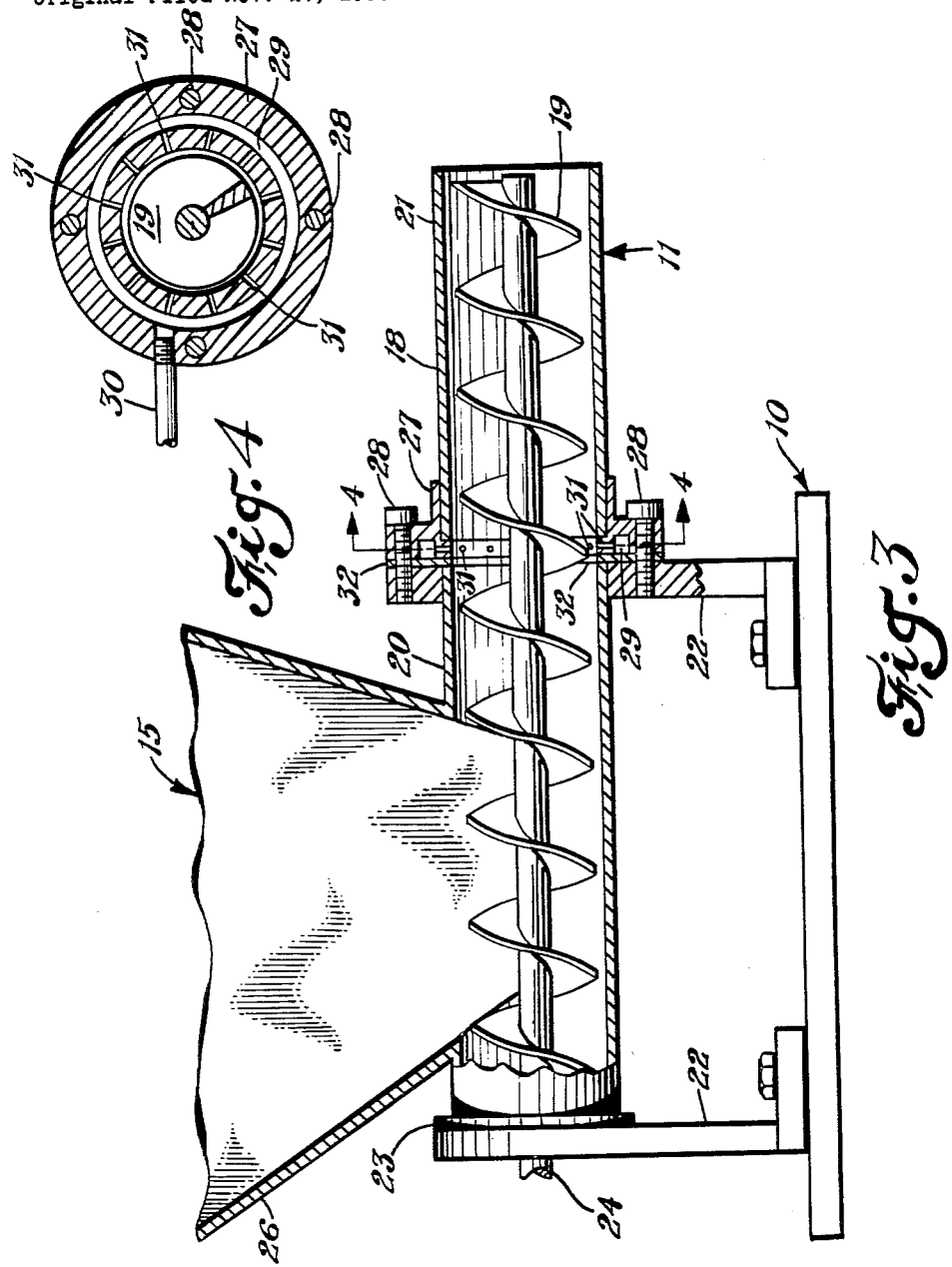

2,940,117
Patented June 14, 1960

2,940,117
POULTRY STUFFING DEVICE

Ernest Bonami, Chicago, Ill., assignor to Swift & Company, Chicago, Ill., a corporation of Illinois Original application Nov. 27, 1956, Ser. No. 624,651. Divided and this application Feb. 7, 1958, Ser. No. 713,819

2 Claims. (Cl. 17—11)

The present invention relates to an apparatus for use in filling the body cavity of dressed poultry with stuffing.

With the increasing importance of ready-to-cook foods, one of the products for which a substantial demand has been created and which is gaining in sales is stuffed poultry, particularly stuffed turkeys. These are prepared and sold, usually in the frozen form, with all the necessary preparatory steps being completed so that all the housewife need do is to remove the birds from their wrappers and put them in a heated oven for cooking. In order to facilitate the stuffing operation, with a viewpoint of holding down the cost of preparation, it is desirable that the stuffing by means of a pump or extrusion apparatus be fed to a nozzle or conduit which may be inserted in the body cavity of the dressed birds to fill the cavity with the stuffing. However, the consistency of the stuffing is such that the usual pump or extrusion apparatus "works" the product to an extent such as to create an undesirable change in its consistency. There is a compaction of the dressing with a tendency to "set up" the product. The end result is that the stuffing when once emplaced by such an apparatus does not have the characteristics desired for the stuffing. The principal object of the present invention is to provide an apparatus having a conduit or nozzle that may be inserted into the body cavity and which will emplace the stuffing therein without causing any deleterious effect on the quality of the dressing by compaction or otherwise.

To achieve this end I have developed a method and apparatus in which a dry dressing mix is prepared which can be handled and pumped without any deleterious effects. Immediately prior to the emplacement of the dressing in the body cavity the desired amount of a potable liquid, usually water, is added to the dry mix to create a dressing of the characteristics that are sought. Preferably the dressing is agitated for a brief period of time between the time of the adding of the liquid and the emplacement of the dressing in the body cavity to insure that the liquid is relatively evenly distributed through the dressing mix. However, in some embodiments, particularly where the poultry is not to be frozen or will not be frozen immediately after stuffing, the agitation may not be necessary because even if the liquid is unevenly distributed throughout the mix at the time that the mix is emplaced in the body cavity, it will distribute itself through the mix due to absorption and the reaching of a vapor pressure equilibrium.

A specific example of a process following my method is to prepare a dry mix of the following composition: Dried bread croutons are mixed with shortening in the proportions, by weight, of 69% of the former and 23% of the latter. The remaining 8% is made up of spices and other seasoning materials. This material is pumped through an extrusion apparatus having a nozzle sufficiently small to be received within the body cavity. Immediately before the dry mix is ejected from the extrusion apparatus, 43 parts by weight of water is added to 100 parts of the dry mix and there is a brief agitation of the mix before extrusion. In this specific example the water constitutes approximately 30% by weight of the total stuffing. However, the amount of liquid will vary substantially with different stuffings and will range from approximately 15% to approximately 45%.

Specific embodiments of apparatus embodying my invention are illustrated in the drawings, in which:

Figure 3 is an enlarged elevation, partially in section, of the extrusion and liquid feeding head of Figures 1 and 2;

Figure 4 is a section taken at line 4—4 of Figure 3;

From these drawings and the following description, further objects and advantages of my invention will be readily apparent.

Figure 1:
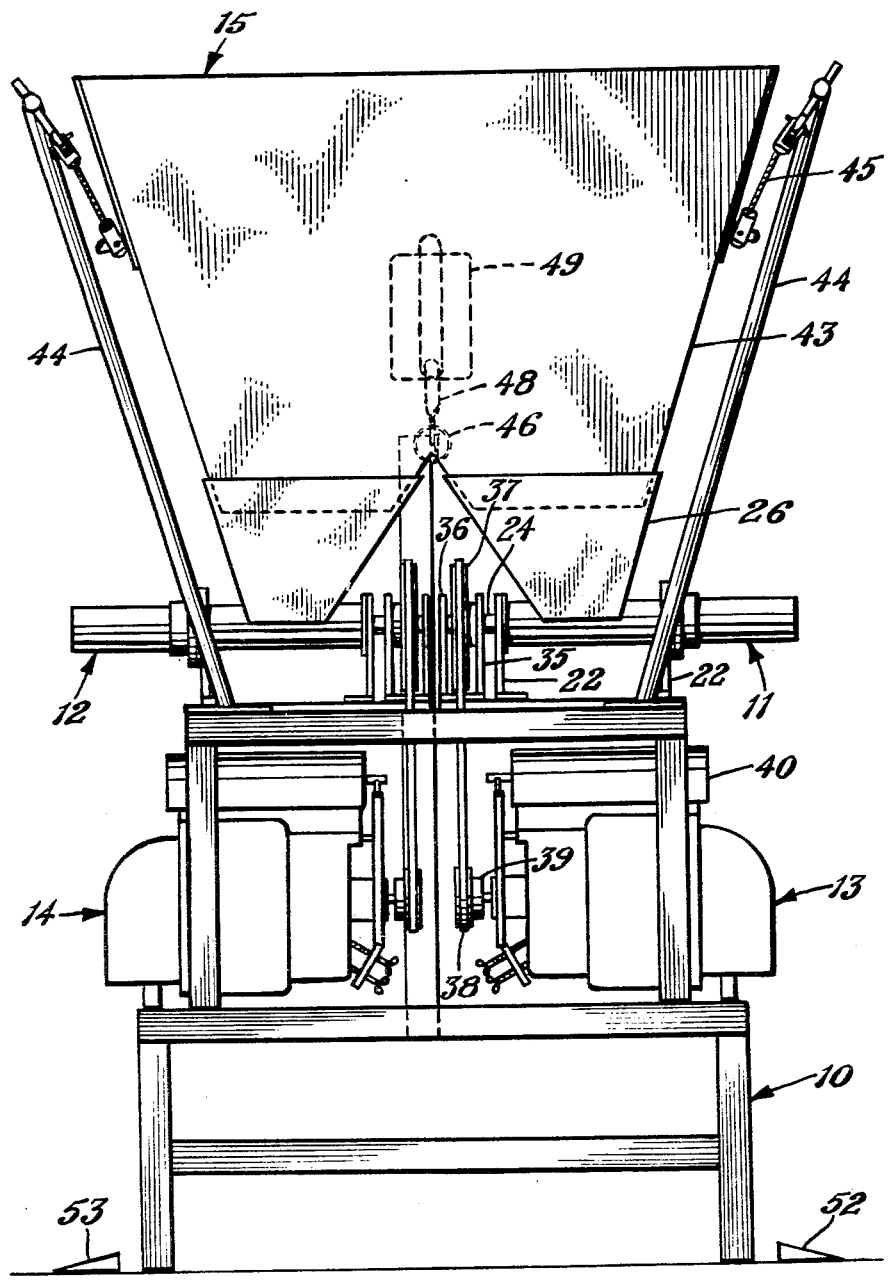
Figure 1 is a side elevation of one embodiment.
Figure 2:
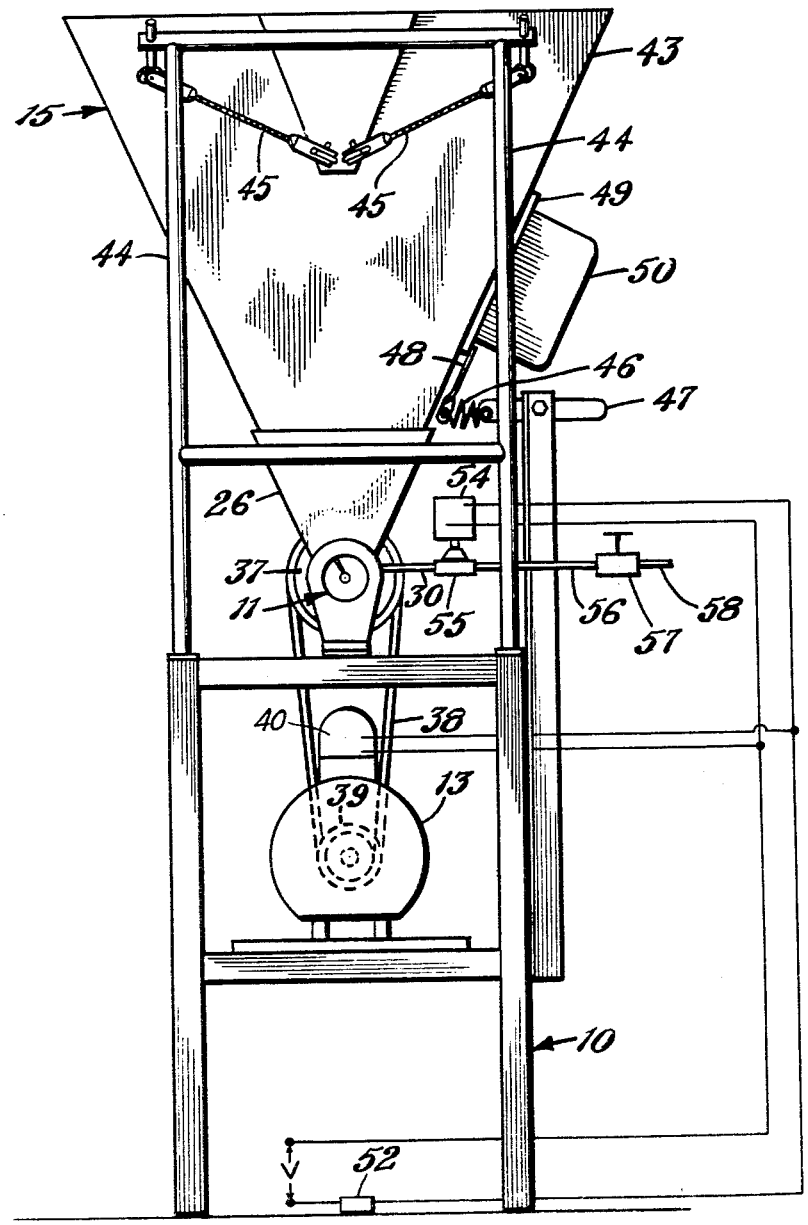
Figure 2 is an end elevation of the embodiment of Figure 1.

The embodiment illustrated in Figures 1 and 2 is a dual head machine constructed and arranged to permit two operators to simultaneously stuff birds independently of each other. The only elements in common to the two heads are the feed hopper for the dry mix and the frame. A description of one head therefore will suffice for the description of both since the structure of the other will actually be covered by the description of one head. The machine comprises a frame, generally 10, duplicate extrusion heads generally 11 and 12, respectively, a power supply means for each extrusion head, generally 13 and 14, respectively, and a feed hopper generally 15 for the dry mix.

The extrusion head 11, best seen in Figures 3 and 4, comprises a tube 18 having a helical screw 19 therein for moving the product through the tube. For ease of manufacture and cleaning, tube 18 is made in two parts, one of which may be termed the hopper section 20 and the other of which may be termed the nozzle section 21. Tube 18 is suitably supported on frame 10 as by means of legs 22 secured to hopper section 20 of the tube, with the rear end having a closure plate 23 in which is a suitable bearing, not shown, for the shaft 24 of screw 19. The hopper 15 includes a bottom section 26 secured to the hopper section 20 of the tube 18 with the interior of the two in communication as seen in Figure 3. An annular boss 27 is attached to the nozzle section 21. Screws 28 passing through boss 27 and threaded into leg 22 hold the two sections of the tube 18 together and in alignment with each other to form a single tube. Within boss 27 is an annular passageway 29 which communicates with a liquid feed pipe 30. A series of radial passageways 31 communicate between annular passageway 29 and the open interior of tube 18. A gasket 32 provides a liquid seal between boss 27 and leg 22.

Referring now to Figure 1, legs 35 and 36 attached to frame 10 carry bearings for shaft 24 with a V-belt pulley 37 being attached to shaft 24 between the two legs. Pulley 37 is connected by V-belt 38 to a pulley 39 on the output shaft of power means 13. Power means 13 comprises an electric motor in a single case with a clutch and a brake. A solenoid 40 acts to engage the clutch when energized with the clutch being disengaged and the brake engaged when the solenoid is de-energized. Such a motor is a standard article of manufacture.

As previously mentioned, the lower section 26 of hopper 15 is fixedly secured to the extrusion head 11. The upper section 43 of hopper 15 is suspended from uprights 44 of frame 10 by means of cables 45. The lower end of the upper section 43 is of the same configuration as the upper end of the lower section 26, but of sufficiently smaller dimensions so that the upper portion 43 of the hopper 15 extends a short distance into the lower section 26 without any contact between the walls of the two sections. This position is maintained by cables 45 in conjunction with a spring 46 connecting arm 47 of frame 10 and arm 48 secured to the upper section 43 of the hopper through a base plate 49 attached to the side of the hopper. An electric vibrator 50 is mounted on base plate 49. Vibrator 50 is a common article of commerce and provides a rapid vibration of the upper section 43 of insufficient magnitude to cause the two sections 43 and 26 of the hopper 15 to contact each other during the vibratory movement.

The controls include foot switches 52 and 53. Foot switch 52 is connected in series with solenoid 40 of power means 13 and with a suitable source of electric power so as to energize the solenoid to engage the clutch of power means 13 when the foot switch is actuated. Foot switch 52 is also connected in series with the solenoid 54 of a solenoid actuated valve 55 and with a suitable source of electric power to open the valve when the foot switch is actuated. As is common in the art, the valve includes a spring, not shown, to close the valve 55 when the solenoid 54 is not energized. Valve 55 is connected to pipe 30 leading to extrusion head 11. A pipe 56 connects valve 55 with a pressure regulating valve 57. A pipe 58 connects pressure regulating valve 57 with a suitable source of liquid supply, not shown. Similarly, foot switch 53 is connected to control the operation of extrusion head 12 in the same manner as foot switch 52 is connected to control extrusion head 11.

Figure 5:
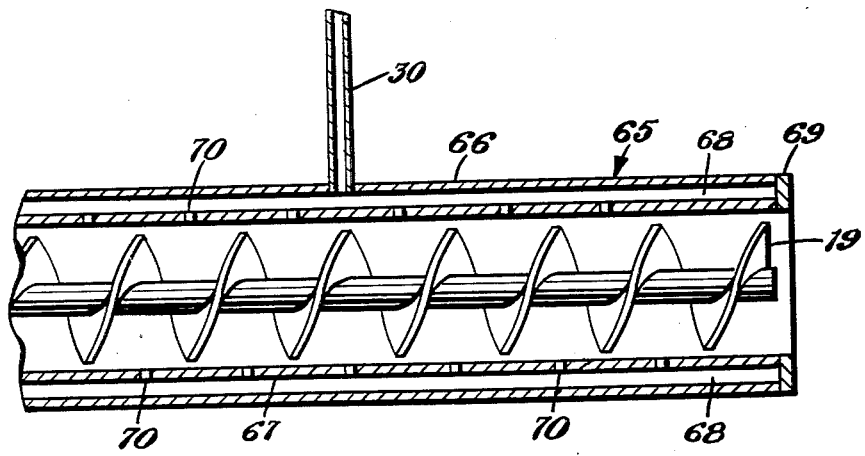
Figure 5 is an extrusion nozzle comprising an alternative form of liquid feed.

Figure 5 illustrates an alternative embodiment of the structure for feeding liquid to the dry mix. Here the nozzle section, generally 65, of the extrusion head comprises a pair of concentric tubes 66 and 67, with a cylindrical passageway 68 therebetween. Each end of passageway 68 is closed, the outer end being closed by an annular plate 69 secured to tubes 66 and 67. Pipe 30 communicates with passageway 68 and a plurality of spaced radial passageways 70 communicate between passageway 68 and the interior of the nozzle within which screw 19 moves the dry mix.

Figure 6:
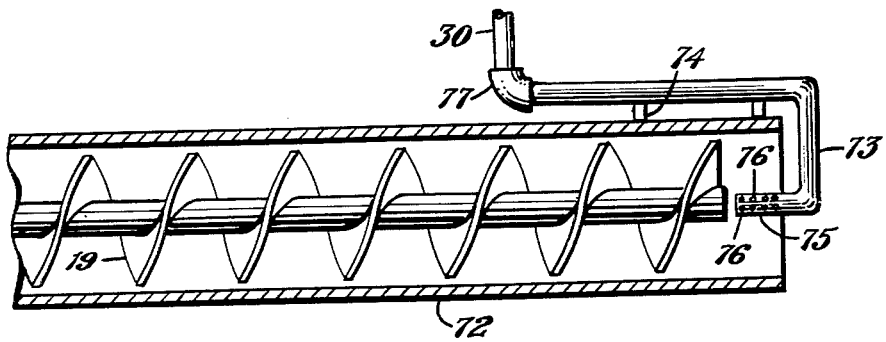
Figure 6 is a cross-section of an extrusion nozzle embodying a further alternative form of liquid feed.

A further embodiment is illustrated in Figure 6, wherein screw 19 moves the dry mix through the central opening in a single tube 72. The tube is slightly longer than the screw 19 so as to provide a space at the end of the nozzle. A pipe 73 mounted on tube 72 by means of supports 74 has one end 75 projecting into the space at the open end of the nozzle with the end 75 being concentric with the axis of screw 19. The end of pipe 75 is closed, and about the periphery thereof are a plurality of fluid openings 76 extending through the wall of the pipe from the interior thereof. Pipe 73 is connected to fluid supply pipe 30 as by means of elbow 77.

In operating the apparatus to carry out my method, hopper 15 is filled with the dry mix which is kept flowing downwardly in the hopper by reason of the vibration of vibrator 50. The electrical and fluid connections are made as previously outlined. The operator inserts the open end of extruder 11 into the body cavity of a bird. Foot pedal 52 is depressed to commence the rotation of screw 19 to move the dry mix toward the open end of the extruder. As the mix passes the fluid openings 31 it receives the potable fluid needed to complete a stuffing of the desired consistency. In moving from openings 31 through the remainder of the nozzle section 21, the mix is agitated by screw 19 to obtain some blending of the mix. It will be apparent that in passing openings 31 the outer portions of the mix, that is those portions nearest openings 31, will receive more moisture than will the inner portions of the mix, that is those portions immediately adjacent the shaft of the screw 19. These two portions will be blended to a degree with the exact amount of blending depending on the length of the nozzle section 21.

The amount of potable liquid received by the dry mix will be dependent upon the size of openings 31 and the setting of pressure regulating valve 57. For given size openings 31, the amount of liquid may be increased or decreased by increasing the liquid pressure at openings 31 or decreasing that pressure, respectively, by the suitable adjustment of valve 57. When the body cavity of the bird has been filled, the operator releases foot pedal 52 which disengages the clutch of the power means 13 to stop the feed of the dry mix from hopper 15 and at the same time to close valve 55 to stop the flow of the liquid so as to prevent any saturation of the mix in the nozzle by the liquid. After the body cavity of another bird has been placed over nozzle 11, the operator then fills that cavity by actuating foot switch 52. A second operator working on the other side of the dual head machine similarly fills the body cavity of birds by placing them over nozzle 12 and actuating foot switch 53.

The operation of the alternative embodiments of Figures 5 and 6 is the same as that described. However, because of the alternative liquid feeds different formulations of dry mix may be handled to produce different types of stuffings. As mentioned previously herein, an embodiment of the type of Figure 6 will not obtain an equal blending of the wet and dry portions of the stuffing. However, this embodiment will be satisfactory where the conditions are such that the absorption and the equalization of vapor pressure will permit even distribution of the liquid within the dry mix after the stuffing has been emplaced in the body cavity.

The foregoing detailed description is only for clearness of understanding and for the purpose of complying with 35 U.S.C. 112, and I do not desire to be limited to the exact details of construction shown and described for obvious modifications will occur to a person skilled in the art.

This application is a division of my prior application Serial No. 624,651 filed November 27, 1956.

I claim:

1. Poultry stuffing apparatus comprising: a stuffing tube having a discharge end of a size to be inserted into the body cavity of dressed poultry, supply means communicating with the interior of said tube for supplying a substantially dry component of said stuffing to the interior of said tube at a point spaced from said end, a screw within said tube to move said dry component from said point to said end, power means connected to said screw to rotate said screw in a direction to move said stuffing from said point to said end, liquid feeding means associated with said tube having radial openings communicating uniformly with the interior of said tube at a point between said first mentioned point and said end, means to supply liquid to said feeding means, regulating means connected to said liquid feeding means to control the rate of flow of said liquid component, and control means connected to said liquid supply means and to said power means to simultaneously commence and stop the flow of liquid and rotation of the screw.

2. Apparatus for mixing and inserting a stuffing material into the body cavity of birds, said apparatus comprising: a stuffing tube having a discharge end of a size to be inserted into the body cavity of dressed poultry, a hopper communicating with said tube at a point spaced from said end for supplying a substantially dry component of said stuffing material, a screw within said tube to move said dry component from said point to said end, power means connected to rotate said screw in a direction to move said stuffing from said point to said end, annular liquid component feeding means associated with said tube for distributing a liquid component to the dry component therein, said liquid feeding means having radial openings communicating uniformly with the interior of said tube at a location between said first mentioned point and said end, means to supply liquid to said feeding means, regulating means connected between said liquid supply means and said feeding means to control the rate of flow of said liquid component, and control means connected to said liquid supply means and to said power means to simultaneously commence and stop the flow of liquid and rotation of the screw.

References Cited in the file of this patent

UNITED STATES PATENTS

| | | |
|---|---|---|
| 1,776,597 | Poeppel et al. | Sept. 23, 1930 |
| 2,377,069 | Brubaker | May 29, 1945 |
| 2,633,170 | Balmain | Mar. 31, 1953 |